US007320413B2

(12) United States Patent
Fusi

(10) Patent No.: US 7,320,413 B2
(45) Date of Patent: Jan. 22, 2008

(54) SELF-CLOSING DISPENSING CONTAINER

(76) Inventor: John C. Fusi, JCF Research Associates, Inc. 320 Essex St. Ste 5, Stirling, NJ (US) 07980

( * ) Notice: Subject to any disclaimer, the term of this patent is extended or adjusted under 35 U.S.C. 154(b) by 263 days.

(21) Appl. No.: 11/146,360

(22) Filed: Jun. 7, 2005

(65) Prior Publication Data

US 2005/0274733 A1 Dec. 15, 2005

Related U.S. Application Data

(60) Provisional application No. 60/578,044, filed on Jun. 8, 2004.

(51) Int. Cl.
*B65G 59/00* (2006.01)
*B65H 3/00* (2006.01)

(52) U.S. Cl. ...................... 221/255; 221/259; 221/256; 221/257; 221/239

(58) Field of Classification Search ......... 221/1–312 C
See application file for complete search history.

(56) References Cited

U.S. PATENT DOCUMENTS

| | | | | |
|---|---|---|---|---|
| 1,302,624 | A | 5/1919 | Barton | |
| 1,451,279 | A | 4/1923 | Strietelmeir | |
| 3,286,823 | A | 11/1966 | Gillespie | |
| 3,308,989 | A | 3/1967 | Alltop et al. | |
| 3,421,658 | A | 1/1969 | Cooksey | |
| 3,783,540 | A * | 1/1974 | Barclay | 40/511 |
| 4,202,445 | A * | 5/1980 | Porter | 206/37 |
| 4,240,564 | A * | 12/1980 | Pritchard | 221/213 |
| 4,265,369 | A * | 5/1981 | Aboussouan | 221/87 |
| 4,772,168 | A * | 9/1988 | Ackeret | 414/792.7 |
| 4,779,759 | A * | 10/1988 | Seavey | 221/232 |
| 4,887,739 | A * | 12/1989 | Parker | 221/232 |
| 5,044,101 | A * | 9/1991 | Ackeret | 40/511 |
| 5,113,613 | A * | 5/1992 | Ackeret | 40/513 |
| 5,337,897 | A * | 8/1994 | Yablans | 206/581 |
| 5,353,956 | A * | 10/1994 | Wilson | 221/198 |
| D371,723 | S | 7/1996 | Hirao | |
| 5,791,461 | A * | 8/1998 | Tsuge | 206/39.4 |
| D422,460 | S | 4/2000 | Haner et al. | |
| D423,301 | S | 4/2000 | Haner et al. | |
| D423,302 | S | 4/2000 | Haner et al. | |
| 6,412,627 | B1 * | 7/2002 | Tiscione et al. | 206/39.4 |
| D479,395 | S | 9/2003 | Westrich et al. | |
| 6,669,020 | B1 | 12/2003 | Mamiye | |
| 6,726,054 | B2 | 4/2004 | Fagen et al. | |
| 6,981,591 | B2 * | 1/2006 | Logan | 206/451 |
| 2003/0106900 | A1 * | 6/2003 | Storz | 221/259 |
| 2003/0183643 | A1 | 10/2003 | Fagen et al. | |
| 2004/0079665 | A1 | 4/2004 | Mamiye | |
| 2005/0133524 | A1 * | 6/2005 | De Laforcade | 221/65 |
| 2005/0274733 | A1 * | 12/2005 | Fusi | 221/232 |

* cited by examiner

*Primary Examiner*—Gene O. Crawford
*Assistant Examiner*—Michael K Collins
(74) *Attorney, Agent, or Firm*—Frank Marino

(57) ABSTRACT

A disposable container for holding and dispensing one oral care, candy and/or medicinal strip at a time, without the need to open the package or to insert one's dirty fingers into the package, thereby eliminating the contamination of the remaining strips, and allowing the use of only one hand to dispense a strip directly on to the tongue, thereby eliminating the need to place ones dirty hand into the mouth.

13 Claims, 5 Drawing Sheets

SELF-CLOSING DISPENSING CONTAINER

This application is a formalization of and claims the benefit of U.S. Provisional Application 60/578,044 filed Jun. 8, 2004.

FIELD OF THE INVENTION

The present invention is related to a disposable package which holds and ejects water soluble strips for various applications, (including but not limited to oral care, medicinal and/or vitamin dosing, dispensing of personal hygiene and/or grooming products, water miscible cosmetic products, and candy and/or food products), one at a time, without the need to open the package or to insert one's fingers into the package, thereby eliminating the contamination of the remaining strips, and allowing the use of only one hand to dispense a strip directly into the mouth, thereby eliminating the need to insert one's dirty hand into one's mouth.

BACKGROUND OF THE INVENTION

Containers for holding and dispensing water soluble strips for various applications, (including but not limited to oral care, medicinal and/or vitamin dosing, dispensing of personal hygiene and/or grooming products, water miscible cosmetic products, and candy and/or food products) are also well known. Such strips are commonly packaged in containers with access doors, which force the user to open the door with one hand while holding the container with the other, to reach into the container and grasp the topmost strip from the stack, to insert that strip into the mouth by hand, and to re-close the container door. Besides the number of actions that such containers require, such a procedure can lead to the contamination of strips by the insertion of dirty fingers into the container. To dispense a strip to someone other than the owner of the package, either the owner's fingers must touch the guest's strip, potentially contaminating it, or the guest's fingers must enter the owner's package, potentially contaminating the remaining strips. Additionally, the need for the use of both hands to dispense the strip can be troublesome while doing such activities as driving a car or when both hands are not free. Further, it is common to forget to close the container, thereby subjecting the remaining strips to further contamination.

There exists therefore a need for a dispensing container for water soluble strips that provides for a sanitary and less tedious dispensing procedure.

In particular, there is the need for a container that allows for the dispensing of a single strip from the container into the other hand without the need to insert any fingers into the container.

Additionally, there is the need for a container that allows for the dispensing of a single strip directly into the mouth with the use of only one hand and without the need to insert any fingers into the mouth.

Additionally, there is the need for a container that allows for reliable dispensing of one and only one strip per actuation, to serve as a dose-regulating container for medicinal strips.

Additionally, there is the need for a self-closing container.

Such needs are all fulfilled by a self-closing single strip dispensing container in accordance with the present invention.

SUMMARY

It is a first aspect of the present invention that a housing is provided for containing and protecting a stack of water soluble strips for various applications, (including but not limited to oral care, medicinal and/or vitamin dosing, dispensing of personal hygiene and/or grooming products, water miscible cosmetic products, and candy and/or food products) during shipping, display, and use. Such a housing is not only adapted to serve its intended purposes sufficiently, but is also pleasing to the eye, is inexpensive, uses a minimal amount of material, and is adapted to allow for simple assembly. For these reasons, the container of the present invention is at least as useful and practical as those containers of the prior art and suffers no disadvantages in comparison thereto.

In the preferred embodiment of the invention, an external actuator is provided which allows the user to partially eject a single strip from the container through a window, on a retractable carriage, without inserting a finger into the container. Such an operation can easily be accomplished by the same hand, be it the right or the left hand, that is holding the container. The partially ejected strip may be grasped by the other hand, without contaminating any of the remaining strips that are inside of the container, or may be placed directly from the container onto the tongue. The carriage is biased to retract into the container where it receives the next strip from the top of the stack, to be ready for the next cycle, and whereby it seals the window to avoid contamination of the remaining strips.

In addition to the housing, all of the internal elements of the container are inexpensive to manufacture, simple to assemble, materially minimal, sanitary and disposable.

According to the following description, a method is also disclosed for dispensing water soluble strips for various applications, (including but not limited to oral care, medicinal and/or vitamin dosing, dispensing of personal hygiene and/or grooming products, water miscible cosmetic products, and candy and/or food products) from the container. In general the method involves actuating a carriage to partially eject a strip as characterized above.

Also according to the following description, novel uses of material are provided, generally involving the combination of differing functions by single components, to take advantage of varying characteristics of the materials used in those components and to combine aesthetic and functional purposes, in a manner which provides several improvements over the prior art.

DETAILED DESCRIPTION OF THE PREFERRED EMBODIMENT

Figure 12:
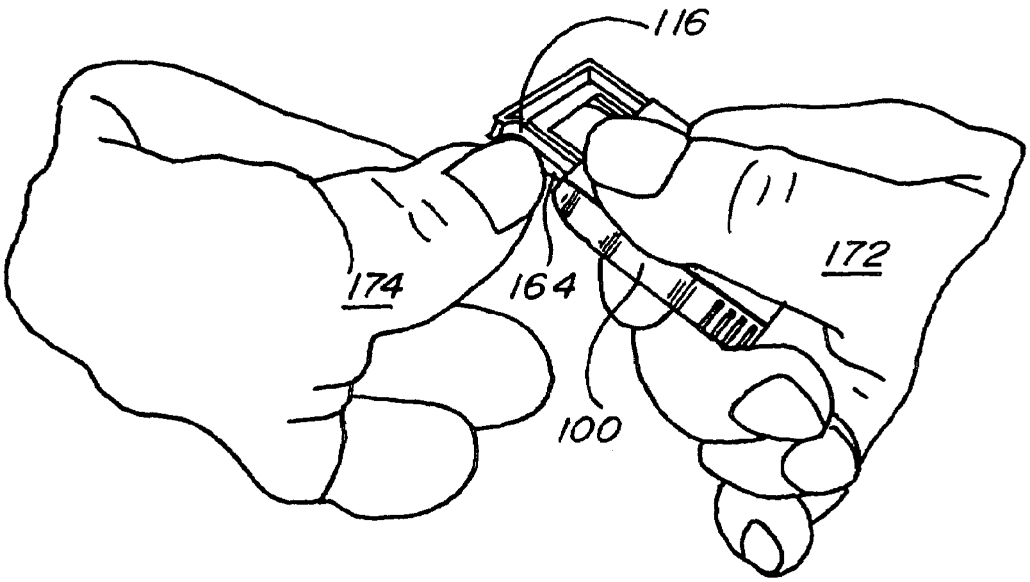
FIG. 12 is a perspective view of the container of FIG. 1 in the process of ejecting a strip for removal by the user's other hand.
Figure 3:
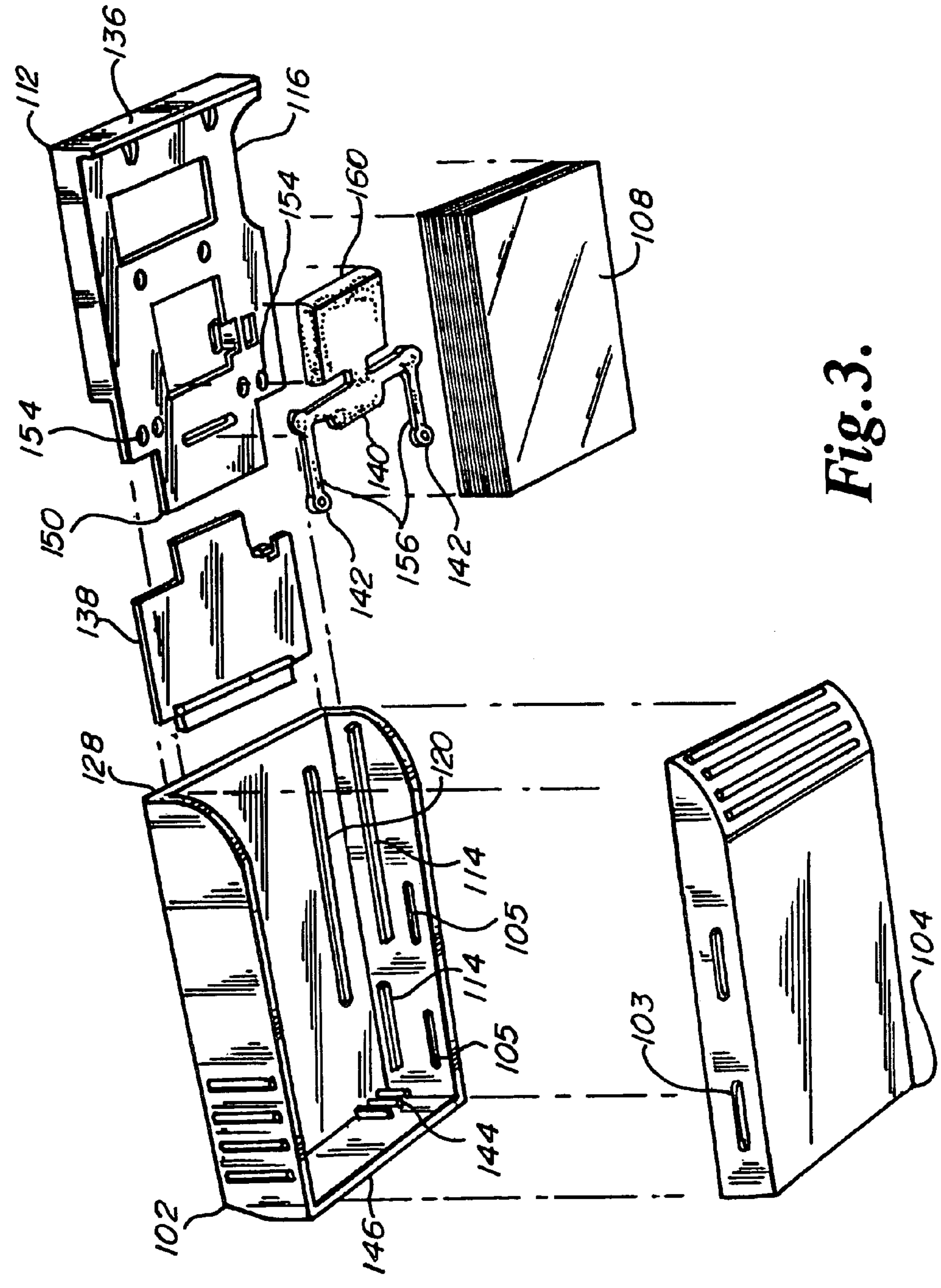
Figure 4:
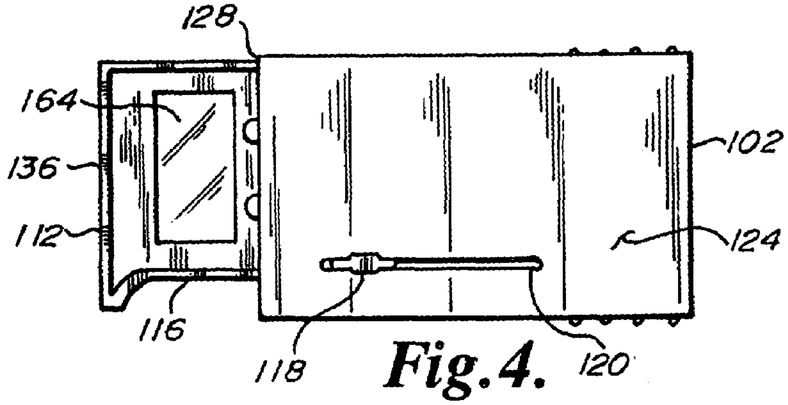
FIG. 4 is a top view of the container of FIG. 1 in its ejecting state, showing a strip being partially ejected there-from, FIG. 5 is a side view of the container of FIG. 1 in its ejecting state, showing a strip being partially ejected there-from, FIG. 6 is a side sectional view of the container of FIG. 1 in its closed state, including a full stack of strips.
Figure 5:
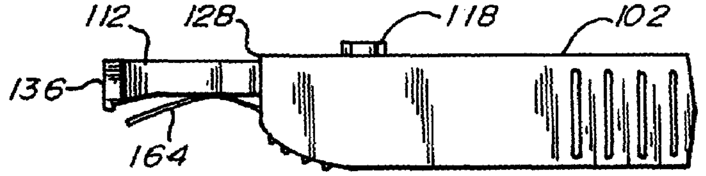
Figure 11:
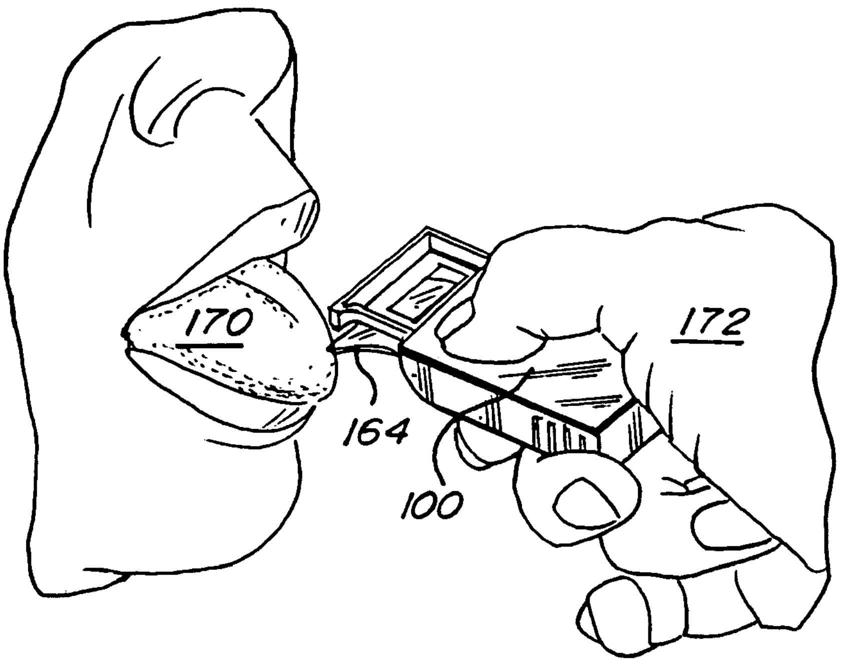
FIG. 11 is a perspective view of the container of FIG. 1 in the process of ejecting a strip directly onto the user's tongue.
Figure 13:
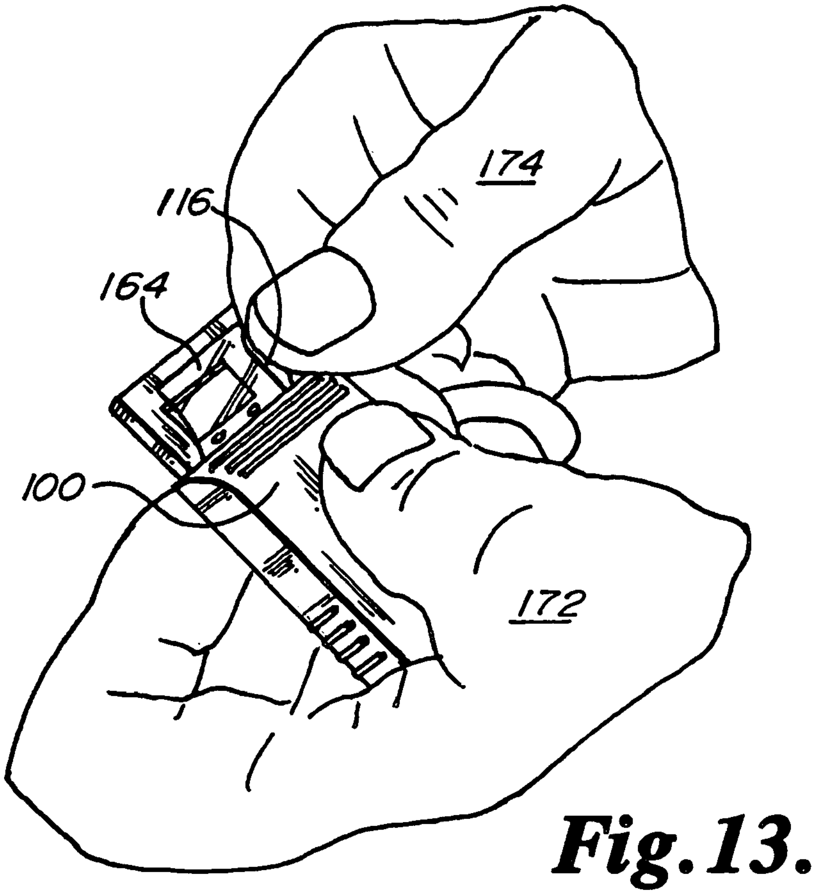
FIG. 13 is a perspective view of the container of FIG. 1 in an alternate process of ejecting a strip for removal by the user's other hand.

The preferred embodiment of the present invention is herein described, with reference to the accompanying figures, in which a self-closing water soluble strips for various applications, (including but not limited to oral care, medicinal and/or vitamin dosing, dispensing of personal hygiene and/or grooming products, water miscible cosmetic products, and candy and/or food products) dispensing container is shown in FIGS. 1-10, and the preferred methods of dispensing such strips from this container are shown in FIGS. 11-13.

Referring first to FIGS. 1-10, container/dispenser 100 includes a polymeric housing 102, and cover 104, which are affixed together by the snap fitting of ribs 103 of the cover into grooves 105 of the housing. The housing and cover thus define a generally rectilinear shape and hollow interior chamber 106 for containing a stack of water soluble strips for various applications, (including but not limited to oral care, medicinal and/or vitamin dosing, dispensing of personal hygiene and/or grooming products, water miscible cosmetic products, and candy and/or food products) 108, disposed within the lower portion of the chamber.

Housing 102 and cover 104 are preferably injection molded of polypropylene, which is chosen for its sanitary properties and low cost. Numerous other materials can be substituted with nearly equal efficacy, including but not limited to; polystyrene, ABS, styrene-butadiene and HDPE.

Carriage 112 is disposed within the upper portion of chamber 106 and vertically positioned between longitudinal ribs 114 so that the carriage 112 is transversely affixed to housing 102, but longitudinally movable relative thereto. Carriage 112 is also preferably injection molded of polypropylene, which additionally has lubricious properties that lend well to such sliding contact between the carriage and housing.

Figure 1:
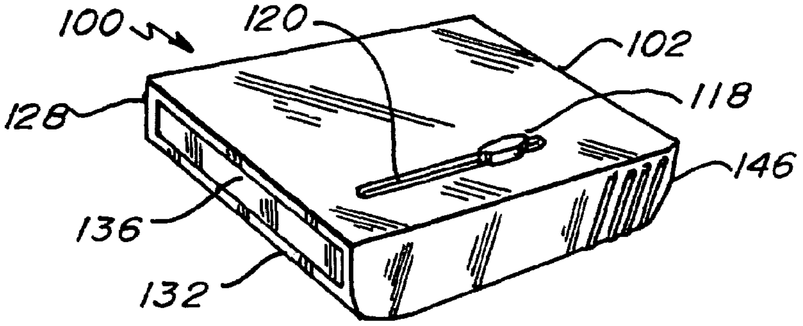
FIG. 1 is a top perspective view of a container according to the preferred embodiment in its closed state.
Figure 2:
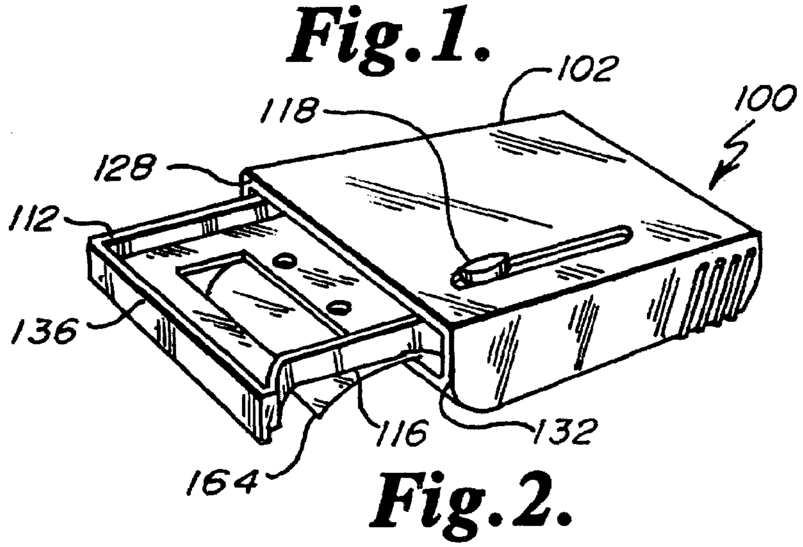
FIG. 2 is a top perspective view of the container of FIG. 1 in its ejecting state, showing a strip being partially ejected there-from, FIG. 3 is an exploded view of the container of FIG. 1, including a full stack of strips.
Figure 6:
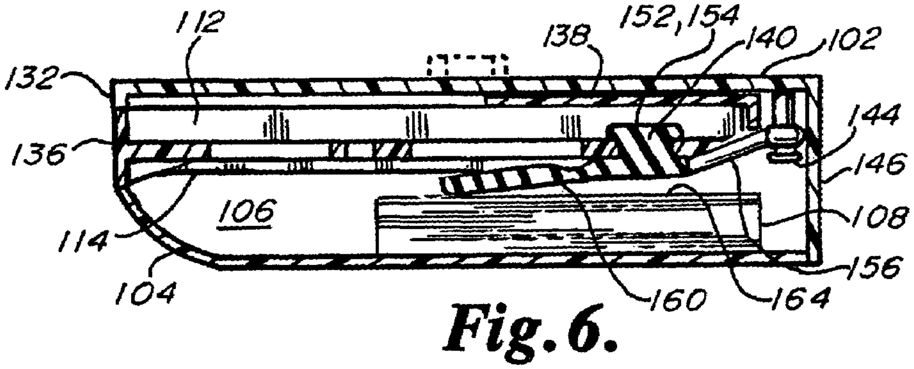
Figure 7:
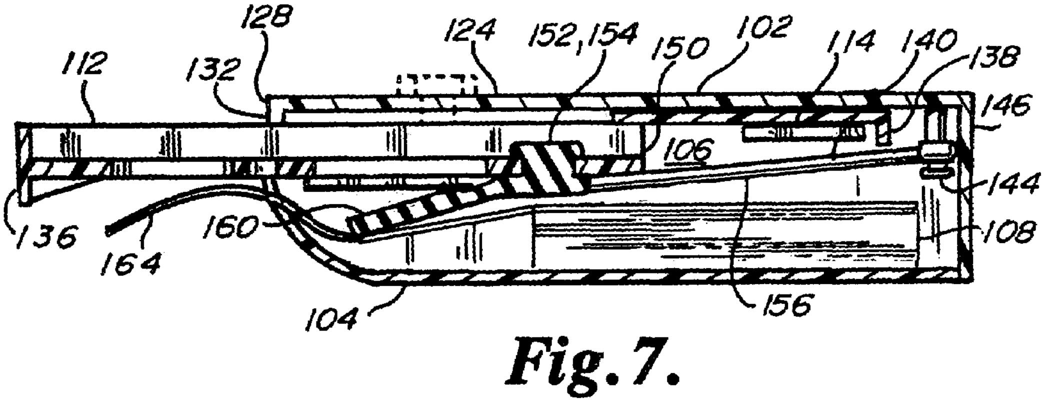
FIG. 7 is a side sectional view of the container of FIG. 1 in its ejecting state, showing a strip being partially ejected there-from, FIG. 8 is a partial perspective view from the underside of the container of FIG. 1 in its closed state, with the cover and strips removed.
Figure 8:
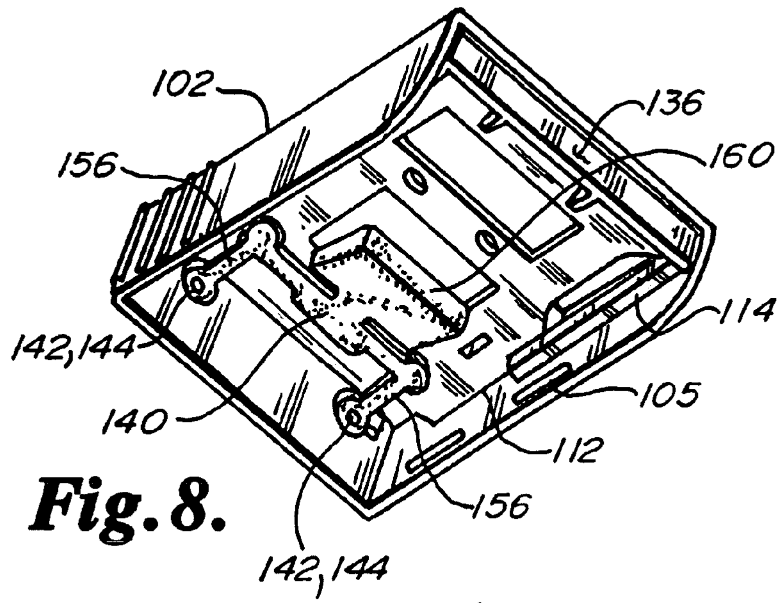
Figure 9:
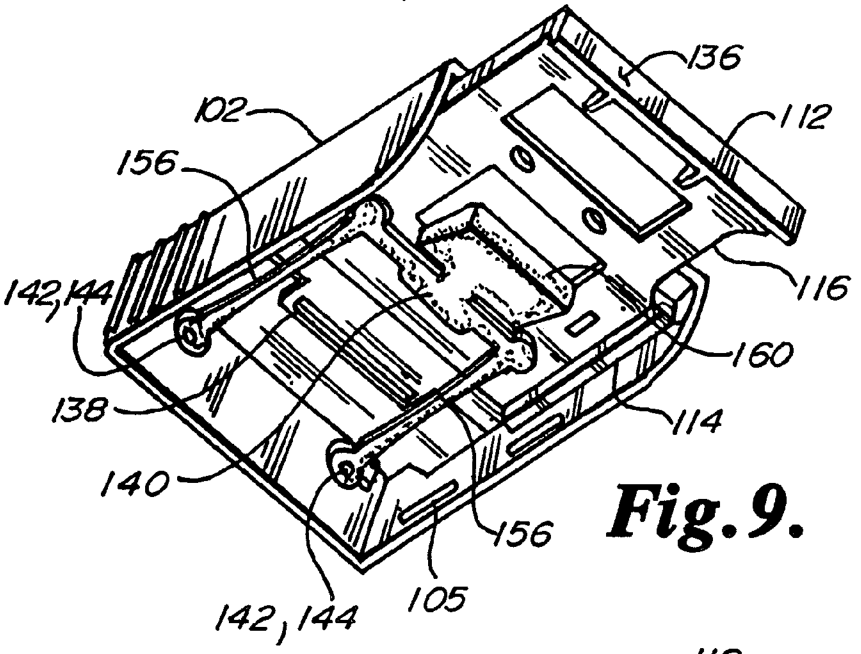
FIG. 9 is a partial perspective view from the underside of the container of FIG. 1 in its ejecting state, with the cover and strips removed.
Figure 10:
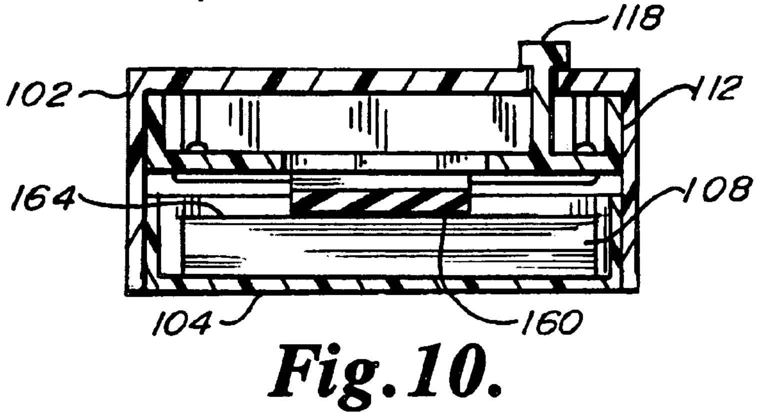
FIG. 10 is an end sectional view of the container of FIG. 1.

Carriage 112 includes actuator 118, which protrudes upwardly through slot 120 of the upper wall 124 of the housing 102 and is thereby accessible to a user so that by pushing the actuator 118 forward longitudinally within the slot 120, the carriage 112 is moved equidistantly forward relative to the housing 102. The range of this motion is sufficient to allow the carriage 112 to partially protrude from the forward end 128 of the housing 102 though window 132 formed between the housing 102 and cover 104 at their forward ends, as shown in FIGS. 2, 4, 5 and 7, so that finger notch 116 is exposed, and to return to a fully retracted state, as shown in FIGS. 1, 6 and 8, wherein the forward end 136 of the carriage closes and seals the window 132 so that chamber 106 is fully enclosed whenever the actuator is not being forced forwardly.

Leaf 138 is disposed between carriage 112 and the housing's upper wall 124 and is adapted to slide longitudinally to cover the exposed posterior end of slot 120 as carriage 112 is moved forwardly.

Retraction spring 140 is affixed to the housing 102 within the chamber 106 by a pair of holes 142 at the posterior end of the spring 140 which fit over posts 144 of the housing 102 near to the housing's posterior end 146. Posts 144 are then heat-staked to permanently affix the spring to the housing. The spring is also affixed near to the posterior end 150 of the underside of carriage 112 by posts 152 of the spring which protrude through holes 154 of the carriage. Posts 152 are then heat-staked to permanently affix the spring to the carriage.

Retraction spring 140 is preferably injection molded of a highly plasticized thermoplastic rubber, such as those compounds based on Shell's Kraton™. This material's high modulus of elasticity allows the spring to strongly bias the carriage toward is retracted state. This biasing is accomplished by the stretching and constricting of arms 156 of the spring.

Retraction spring 140 also includes integrally molded push-bar 160, which hangs downwardly and presses against the top of the oral care strip stack 108. It should be noted that the thermoplastic rubber material of the spring also has a high friction modulus, which results in the frictuous engagement of the push-bar to the top most strip being stronger than the inherent adherence between the individual strips of the stack 108, to allow the push-bar 160 to grasp and pull the uppermost strip 164, and only that strip, and carry that strip 164 with the carriage 112 as the carriage is forced from the housing 102 so that strip 108 is partially ejected through window 132 and from the container 100 as the actuator 118 is moved towards the housing's forward end, as shown in FIGS. 2, 5, 7, 11, 12 and 13. The forward end 164 of cover 104 is tapered upwardly to assist in guiding the ejecting strip 164 towards window 132 as it is being ejected.

Referring now to FIG. 11, it is shown how strip 164 may be ejected directly onto the user's tongue 170, by using only one hand 172, to avoid the need to put the strip into the mouth by a dirty hand as is required by the prior art.

Referring to FIGS. 12 and 13, it is shown that the strip may alternatively be taken by the second hand 174, without the need to insert any dirty fingers into the container and contaminate the remaining strips of the stack, as is required by the prior art. For right handed users (FIG. 12), or left-handed users (FIG. 13), the fingers of the receiving hand 174 can grasp the strip 164 through finger notch 116 and the dispensing hand 172 pushes the actuator 118.

There are also alternative embodiments anticipated by the inventor, which are within the scope of this invention, such as;

1) A gravity-based embodiment, similar to but upside-down from the preferred embodiment, wherein the strips engage the push-bar by the forces of gravity,
2) An embodiment similar to the preferred embodiment but wherein the preferred spring is substituted with two springs, one to provide the retracting force, and one to exert the grasping force against the strips.

It should be obvious to those skilled in the art that the afore-described are merely some of many possible embodiments of the invention, and are not intended to limit the scope of the invention in any way. The invention is therefore best characterized by the following claims;

I claim:

1. A container for storing and individually dispensing sheets from a sheet stack and comprising; a housing forming an interior chamber there-within for storing the sheet stack and having a window allowing communication between said interior chamber and the outside of the container, a carriage disposable in a retracted state within said interior chamber, wherein said carriage is adapted to close said window and thereby substantially prevent communication between said interior chamber and the outside of the container through said window, said carriage being further disposable into an ejecting state wherein at least a portion thereof is extended through said window to the outside of the container, an actuator engageable by a user from the outside of the container and adapted for allowing the user to move said carriage from said retracted state to said ejecting state, wherein said carriage is adapted to engage a single sheet of the sheet stack in said retracted state, and to transport said single sheet from the sheet stack and through said window so that at least a portion of said single sheet is extended outside of the container as said carriage is moved toward said ejecting state, wherein said carriage comprises a spring connected to said housing and adapted to bias said carriage toward said retracted state, and wherein said carriage further comprises a frictuous member adapted to engage the single sheet during said transport thereof, and wherein said carriage comprises said actuator and said actuator extends to the outside of the container through a slot in said housing and the container further comprises a leaf movable with said carriage and adapted to prevent communication between said interior chamber and the outside of the container by substantially covering said slot.

2. The container of claim 1 wherein said extended portion of said carriage comprises a void exposing a grasping portion of said extended portion of said single sheet, said void adapted to allow the fingers of the user to pinch said extended portion of said single sheet at said grasping portion and to remove said single sheet from the container without touching said extended portion of said carriage.

3. A container for storing and individually dispensing sheets from a sheet stack and comprising; a housing forming an interior chamber there-within for storing the sheet stack and having a window allowing communication between said interior chamber and the outside of the container, a carriage disposable in a retracted state within said interior chamber, wherein said carriage is adapted to close said window and thereby substantially prevent communication between said interior chamber and the outside of the container through said window, said carriage being further disposable into an ejecting state wherein at least a portion thereof is extended through said window to the outside of the container, an actuator engageable by a user from the outside of the container and adapted for allowing the user to move said carriage from said retracted state to said ejecting state, wherein said carriage is adapted to engage a single sheet of the sheet stack in said retracted state, and to transport said single sheet from the sheet stack and through said window so that at least a portion of said single sheet is extended outside of the container as said carriage is moved toward said ejecting state, and wherein said carriage comprises a spring connected to said housing and adapted to bias said carriage toward said retracted state, wherein said spring further comprises a frictuous member adapted to move with said carriage and adapted to engage said single sheet during said transport thereof, and wherein said carriage comprises said actuator and said actuator extends to the outside of the container through a slot in said housing and said container further comprises a leaf movable with said carriage and adapted to prevent communication between said interior chamber and the outside of the container by substantially covering said slot.

4. The container of claim 3 wherein said extended portion of said carriage comprises a void exposing a grasping portion of said extended portion of said single sheet, said void adapted to allow the fingers of the user to pinch said extended portion of said single sheet at said grasping portion and to remove said single sheet from the container without touching said extended portion of said carriage.

5. A sanitary container for storing and individually dispensing sheets from a stack of sheets of the group including oral care, candy and medicinal strips and comprising; a housing forming a sanitary chamber there-within for storing the stack and having a window allowing communication between said sanitary chamber and the outside of the container, a carriage disposable in a retracted state within said sanitary chamber wherein said carriage is adapted to close said window and thereby substantially prevent unsanitary communication between said sanitary chamber and the outside of the container through said window, said carriage being further disposable into an ejecting state wherein at least a portion thereof is extended through said window to the outside of the container, an actuator engageable by a user from the outside of the container and adapted for allowing the user to move said carriage from said retracted state to said ejecting state, wherein said carriage is adapted to engage a single sheet of the stack in said retracted state, and to transport said single sheet from said stack and through said window so that at least a portion of said single sheet is extended outside of the container as said carriage is moved toward said ejecting state, and wherein said carriage comprises a spring connected to said housing and adapted to bias said carriage toward said retracted state, wherein said carriage further comprises a frictuous member adapted to engage the single sheet during said transport thereof, and wherein said carriage comprises said actuator and said actuator extends to the outside of the container through a slot in said housing and said container further comprises a leaf movable with said carriage and adapted to substantially prevent unsanitary communication between said sanitary chamber and the outside of the container by substantially covering said slot.

6. The container of claim 5 wherein said extended portion of said carriage comprises a void exposing a grasping portion of said extended portion of said single sheet, said void adapted to allow the fingers of the user to pinch said extended portion of said single sheet at said grasping portion and to remove said single sheet from the container without touching said extended portion of said carriage.

7. A sanitary container for storing and individually dispensing sheets from a stack of sheets of the group including oral care, candy and medicinal strips and comprising; a housing forming a sanitary chamber there-within for storing the stack and having a window allowing communication between said sanitary chamber and the outside of the container, a carriage disposable in a retracted state within said sanitary chamber wherein said carriage is adapted to close said window and thereby substantially prevent unsanitary communication between said sanitary chamber and the outside of the container through said window, said carriage being further disposable into an ejecting state wherein at least a portion thereof is extended through said window to the outside of the container, an actuator engageable by a user from the outside of the container and adapted for allowing the user to move said carriage from said retracted state to said ejecting state, wherein said carriage is adapted to engage a single sheet of the stack in said retracted state, and to transport said single sheet from said stack and through said window so that at least a portion of said single sheet is extended outside of the container as said carriage is moved toward said ejecting state, and wherein said carriage comprises a spring connected to said housing and adapted to bias said carriage toward said retracted state, wherein said spring further comprises a frictuous member adapted to move with said carriage and adapted to engage said single sheet during said transport thereof, and wherein said carriage comprises said actuator and said actuator extends to the outside of the container through a slot in said housing and said container further comprises a leaf movable with said carriage and adapted to prevent unsanitary communication between said sanitary chamber and the outside of the container by substantially covering said slot.

8. The container of claim 7 wherein said extended portion of said carriage comprises a void exposing a grasping portion of said extended portion of said single sheet, said void adapted to allow the fingers of the user to pinch said extended portion of said single sheet at said grasping portion and to remove said single sheet from the container without touching said extended portion of said carriage.

9. A sanitary container for storing and individually dispensing sheets from a stack of sheets of the group including oral care, candy and medicinal strips and comprising; a housing forming a sanitary chamber there-within for storing the stack and having a window allowing communication between said sanitary chamber and the outside of the container, a carriage disposable in a retracted state within said sanitary chamber wherein said carriage is adapted to close said window and thereby substantially prevent unsanitary communication between said sanitary chamber and the outside of the container through said window, said carriage being further disposable into an ejecting state wherein at least a portion thereof is extended through said window to the outside of the container, an actuator engageable by a user from the outside of the container and adapted for allowing the user to move said carriage from said retracted state to said ejecting state, wherein said carriage is adapted to engage a single sheet of the stack in said retracted state, and to transport said single sheet from said stack and through said window so that at least a portion of said single sheet is extended outside of the container as said carriage is moved toward said ejecting state, wherein said extended portion of said single sheet hangs below said extended portion of said carriage during said extended state and said single sheet is thereby adapted to be applied directly onto a person's tongue without being touched by the user's fingers, wherein said carriage further comprises a spring connected to said housing and adapted to bias said carriage toward said retracted state, wherein said carriage further comprises a frictuous member adapted to engage the single sheet during said transport thereof, and wherein said carriage comprises said actuator and said actuator extends to the outside of the container through a slot in said housing and said container further comprises a leaf movable with said carriage and adapted to prevent unsanitary communication between said sanitary chamber and the outside of said container by substantially covering said slot.

10. The container of claim 9 wherein said extended portion of said carriage comprises a void exposing a grasping portion of said extended portion of said single sheet, said void adapted to allow the fingers of the user to pinch said extended portion of said single sheet at said grasping portion and to remove said single sheet from the container without touching said extended portion of said carriage.

11. A sanitary container for storing and individually dispensing sheets from a stack of sheets of the group including oral care, candy and medicinal strips and comprising; a housing forming a sanitary chamber there-within for storing the stack and having a window allowing communication between said sanitary chamber and the outside of the container, a carriage disposable in a retracted state within said sanitary chamber wherein said carriage is adapted to close said window and thereby substantially prevent unsanitary communication between said sanitary chamber and the outside of the container through said window, said carriage being further disposable into an ejecting state wherein at least a portion thereof is extended through said window to the outside of the container, an actuator engageable by a user from the outside of the container and adapted for allowing the user to move said carriage from said retracted state to said ejecting state, wherein said carriage is adapted to engage a single sheet of the stack in said retracted state, and to transport said single sheet from said stack and through said window so that at least a portion of said single sheet is extended outside of the container as said carriage is moved toward said ejecting state, wherein said extended portion of said single sheet hangs below said extended portion of said carriage during said extended state and said single sheet is thereby adapted to be applied directly onto a person's tongue without being touched by the user's fingers, wherein said carriage further comprises a spring connected to said housing and adapted to bias said carriage toward said retracted state, wherein said spring further comprises a frictuous member adapted to move with said carriage and adapted to engage said single sheet during said transport thereof, and wherein said carriage comprises said actuator and said actuator extends to the outside of the container through a slot in said housing and said container further comprises a leaf movable with said carriage and adapted to prevent unsanitary communication between said sanitary chamber and the outside of the container by substantially covering said slot.

12. The container of claim 11 wherein said extended portion of said carriage comprises a void exposing a grasping portion of said extended portion of said single sheet, said void adapted to allow the fingers of the user to pinch said extended portion of said single sheet at said grasping portion and to remove said single sheet from the container without touching said extended portion of said carriage.

13. An economical and disposable container for storing and individually dispensing sheets from a stack of the group including oral care strips, candy strips, and medicinal strips and comprising; an injection molded polymer housing base, an injection molded housing cover affixed to said housing base to form therewith a housing having a sanitary chamber therein for storing the stack, said housing further comprising a window allowing communication between said sanitary chamber and the outside of the container, a carriage disposable in a retracted state within said sanitary chamber wherein a first portion of said carriage closes said window to thereby substantially prevent unsanitary communication between said sanitary chamber and the outside of the container through said window, said carriage being further disposable into an ejecting state wherein at least a second portion thereof is extended through said window to the outside of the container and said first portion does not close said window, said carriage comprising an actuator extending to the outside of the container through a slot in said housing, said actuator being engageable by a user from the outside of the container and adapted to move said carriage from said retracted state to said ejecting state, and a leaf movable with said carriage and adapted to substantially prevent unsanitary communication between said sanitary chamber and the outside of the container by substantially covering said slot, wherein said carriage comprises a frictuous member and a spring, said spring being connected to said housing and adapted to bias said carriage toward said retracted state, said frictuous member being adapted to engage a single sheet of the stack in said retracted state, and to force said single sheet from said stack and through said window with said second portion of said carriage so that at least a portion of said single sheet is extended outside of the container as said carriage is moved toward said ejecting state, wherein said second extended portion of said carriage comprises a void exposing a grasping portion of said extended portion of said single sheet, said void adapted to allow the fingers of the user to pinch said extended portion of said single sheet at said grasping portion and to remove said single sheet from the container without touching said extended portion of said carriage, and wherein said extended portion of said single sheet may hang below said second portion of said carriage during said extended state and said single sheet is thereby adapted to be applied directly onto a person's tongue without being touched by the user's fingers.

* * * * *